US012199343B2

(12) United States Patent
Lee et al.

(10) Patent No.: US 12,199,343 B2
(45) Date of Patent: Jan. 14, 2025

(54) ALL-METAL VIVALDI ANTENNA HAVING BAND NOTCH AND OPERATION FREQUENCY TUNABLE CHARACTERISTICS AND ARRAY ANTENNA INCLUDING THE SAME

(71) Applicant: AGENCY FOR DEFENSE DEVELOPMENT, Daejeon (KR)

(72) Inventors: Cheol Soo Lee, Daejeon (KR); Inseon Kim, Daejeon (KR); Joo Rae Park, Daejeon (KR); Beomjun Park, Daejeon (KR); Hongkyun Ryu, Daejeon (CN)

(73) Assignee: AGENCY FOR DEFENSE DEVELOPMENT, Daejeon (KR)

( * ) Notice: Subject to any disclaimer, the term of this patent is extended or adjusted under 35 U.S.C. 154(b) by 13 days.

(21) Appl. No.: 18/329,621

(22) Filed: Jun. 6, 2023

(65) Prior Publication Data

US 2024/0305003 A1 Sep. 12, 2024

(30) Foreign Application Priority Data

Mar. 7, 2023 (KR) ........................ 10-2023-0030061

(51) Int. Cl.
*H01P 7/06* (2006.01)
*H01Q 13/08* (2006.01)
(Continued)

(52) U.S. Cl.
CPC ............. *H01Q 13/085* (2013.01); *H01P 7/06* (2013.01); *H01Q 21/064* (2013.01); *H01Q 21/08* (2013.01)

(58) Field of Classification Search
CPC ............... H01Q 13/085; H01Q 21/064; H01Q 15/008; H01Q 15/0086; H01Q 21/28; H01Q 13/106
See application file for complete search history.

(56) References Cited

U.S. PATENT DOCUMENTS 5,828,345 A * 10/1998 Waterman .............. H01Q 5/357 343/770
6,496,155 B1 * 12/2002 Sievenpiper ....... H01Q 15/0066 343/756
(Continued)

FOREIGN PATENT DOCUMENTS

CN 114094353 A * 2/2022 ............... H01Q 1/36
EP 82751 A * 6/1983 ............... H01Q 1/38
(Continued)

OTHER PUBLICATIONS

Office Action dated May 22, 2023 of the corresponding Korean Patent Application No. 10-2023-0030061.
(Continued)

*Primary Examiner* — Ricardo I Magallanes
(74) *Attorney, Agent, or Firm* — Dilworth & Barrese, LLP.; Michael J. Musella, Esq.

(57) ABSTRACT

An all-metal vivaldi antenna includes a ground plate, an antenna conductor that includes two radiators positioned on the ground plate and facing each other, a resonator that is formed by removing a portion of a connection part between the antenna conductor and the ground plate and shares one side with the ground plate, a tuning post that is formed in a column structure extending from the ground plate toward an inside of the resonator, and a tuning cap in a form extending therefrom.

20 Claims, 18 Drawing Sheets

(51) Int. Cl.
*H01Q 21/06* (2006.01)
*H01Q 21/08* (2006.01)

(56) References Cited

U.S. PATENT DOCUMENTS

| | | | | |
|---|---|---|---|---|
| 6,670,921 | B2 * | 12/2003 | Sievenpiper | H01P 1/2005 343/754 |
| 8,922,448 | B2 * | 12/2014 | Wong | H01Q 1/48 343/702 |
| 9,172,147 | B1 * | 10/2015 | Manry, Jr. | H01Q 1/286 |
| 9,478,859 | B1 * | 10/2016 | Nair | H01Q 1/2291 |
| 10,727,600 | B1 * | 7/2020 | Saeidi | H01Q 9/0407 |
| 11,437,727 | B2 * | 9/2022 | Boin | H01Q 13/0241 |
| 2009/0128425 | A1 * | 5/2009 | Kim | H01Q 9/42 343/702 |
| 2011/0057852 | A1 * | 3/2011 | Holland | H01Q 13/085 343/810 |
| 2013/0035050 | A1 * | 2/2013 | Gao | H03F 1/223 455/193.1 |
| 2013/0294729 | A1 * | 11/2013 | Layton | H01Q 21/064 385/40 |
| 2014/0361941 | A1 * | 12/2014 | Jenwatanavet | H01Q 5/328 343/722 |
| 2015/0077300 | A1 * | 3/2015 | Wang | H01Q 21/24 343/770 |
| 2015/0109182 | A1 * | 4/2015 | Chen | H01Q 1/525 343/841 |
| 2017/0317422 | A1 * | 11/2017 | Grando | H01Q 9/285 |
| 2017/0331199 | A1 * | 11/2017 | Svensson | H01Q 21/0006 |
| 2019/0067823 | A1 * | 2/2019 | Irion, II | H01Q 13/085 |
| 2019/0165467 | A1 * | 5/2019 | Lin | H01Q 21/20 |
| 2019/0312355 | A1 * | 10/2019 | Brigham | H01Q 13/106 |
| 2019/0363443 | A1 * | 11/2019 | Logan | H01Q 9/065 |
| 2020/0176868 | A1 * | 6/2020 | Feilen | H01Q 25/002 |
| 2021/0203085 | A1 * | 7/2021 | Jordan | H01Q 5/48 |
| 2021/0242568 | A1 * | 8/2021 | Zhang | H01Q 21/28 |
| 2021/0376463 | A1 * | 12/2021 | Massman | H01Q 5/25 |
| 2022/0384964 | A1 * | 12/2022 | Shamblin | H01Q 25/001 |
| 2023/0130575 | A1 * | 4/2023 | Moon | H01Q 1/40 343/702 |
| 2023/0155296 | A1 * | 5/2023 | Wu | H01Q 1/243 343/702 |

FOREIGN PATENT DOCUMENTS

| | | | | | |
|---|---|---|---|---|---|
| IN | 381862 | | * | 10/2017 | H01Q 13/00 |
| JP | 6611800 | B2 | | 11/2019 | |
| KR | 20090051964 | A | | 5/2009 | |
| KR | 20100013586 | A | | 2/2010 | |
| KR | 1020090051964 | A | | 2/2010 | |
| KR | 101952208 | B1 | | 2/2019 | |
| KR | 20210072958 | A | | 6/2021 | |
| KR | 1020210072958 | A | | 6/2021 | |
| KR | 102314805 | B1 | * | 10/2021 | H01Q 21/064 |
| KR | 102459973 | B1 | | 10/2022 | |
| KR | 102586162 | B | | 9/2023 | |
| WO | WO-2016099367 | A1 | * | 6/2016 | H01Q 1/22 |
| WO | WO-2022089089 | A1 | * | 5/2022 | H01Q 1/38 |

OTHER PUBLICATIONS

Notice of Allowance dated Sep. 21, 2023 of the corresponding Korean Patent Application No. 10-2023-0030061.

* cited by examiner

ALL-METAL VIVALDI ANTENNA HAVING BAND NOTCH AND OPERATION FREQUENCY TUNABLE CHARACTERISTICS AND ARRAY ANTENNA INCLUDING THE SAME

CROSS-REFERENCE TO RELATED APPLICATION

This application claims priority to and the benefit of Korean Patent Application No. 10-2023-0030061 filed in the Korean Intellectual Property Office on Mar. 7, 2023, the entire contents of which are incorporated herein by reference.

BACKGROUND

(a) Field

Embodiments of the present invention relates to an all-metal vivaldi antenna having a band notch and operation frequency tunable characteristics while having a shape of an all-metal vivaldi antenna having broadband frequency characteristics, and an array antenna including the same.

(b) Description of the Related Art

An antenna is an important element for transmitting and receiving signals using electromagnetic waves. A size of the antenna affects an operation frequency band, a gain, and a radiation pattern. In general, the size of the antenna tends to be equal to or larger than an operation wavelength. A phased array antenna has a form in which several antennas are arrayed. Due to the electrical influence between multiple antennas, characteristics different from those of an independent antenna are generated. The phased array antenna may adjust a radiation beam pattern and a beam steering angle by controlling a magnitude and phase of a signal supplied to each antenna. An array spacing of the phased array antenna is a function of the frequency and the beam steering angle as shown in Equation 1. In general, the array spacing is set so that a grating lobe does not occur.

$$d \leq \frac{\lambda_H}{1+\sin\theta_0} \quad \text{(Equation 1)}$$

Here, d denotes the array spacing, $\lambda_H$ denotes a wavelength of a highest operating frequency, and $\theta_0$ denotes a maximum beam steering range. In general, the antenna having the broadband frequency characteristics includes a spiral antenna, a log periodic antenna, and the like. In general, the antenna having the broadband frequency characteristics tends to have a larger size than the operation wavelength. According to Equation 1, since the array spacing narrows as the frequency increases and the beam steering angle increases, the antenna larger than the wavelength is not suitable as the phased array antenna for a system requiring a broadband and wide-angle beam steering function. Meanwhile, as the antenna that has the broadband frequency characteristics and may be used as the phased array antenna, there is a vivaldi antenna. A tapered slot antenna is configured to include a feeder that connects a feeding line of a coaxial line to one flat plate and connects the other flat plate to a structure having ground plate characteristics, similar to a feeding structure of a waveguide, a resonator that forms a short-circuited stub electrically connected in parallel with the feeder, and a radiator that induces and radiates the electromagnetic waves induced by the feeder to a free space. In the tapered slot antenna, the feeder has a structure in which one side of an antenna unit is connected to a ground plate and the other side has a gap with the ground plate in order to form a balance mode, and an inner core of the coaxial line is connected to a conductor having the gap with the ground plate. The gap with the ground plate, a thickness and position of the conductor, etc., are selected so as to form good matching with characteristic impedance of the coaxial line. The resonator unit has a cavity structure in which an end is short-circuited, and may be implemented in a quadrangle, a triangle, a circle, or other shapes. The frequency characteristics may vary according to the width and a length of the resonator. The spacing between the two conductors is implemented as a straight line, exponential, or other shapes, so that the radiator induces the electromagnetic waves induced in the feeder to an antenna opening surface and radiates the electromagnetic waves into the free space. The vivaldi antenna may be implemented with a material such as a printed circuit board (PCB) or a metallic material (all metal). In the case of the metallic material, there are characteristics that the loss due to the dielectric of the PCB is small. In the system using such a broadband frequency antenna, when a specific signal needs to be removed according to the surrounding signal environment, a filter having a band notch characteristic needs to be added. However, in the case of using a large number of antennas such as the array antenna, the number of band notch filters is also required as much as the number of array antennas.

SUMMARY

Embodiments of the present disclosure attempts to implement a broadband frequency antenna having a band notch and operation frequency tunable characteristics, and all-metal vivaldi antenna having a tuning post and a tuning cap, and an array antenna including the same, so that a shape of the all-metal vivaldi antenna having broadband frequency characteristics and a band notch frequency and an operation frequency are variable.

According to an exemplary embodiment, an all-metal vivaldi antenna includes a ground plate, an antenna conductor that includes two radiators positioned on the ground plate and facing each other, a resonator that is formed by removing a portion of a connection part between the antenna conductor and the ground plate and shares one side with the ground plate, and a tuning post that is formed in a column structure extending from the ground plate toward an inside of the resonator.

Band notch and operation frequency band characteristics may be adjusted by positioning the tuning post inside the resonator.

The band notch and operation frequency band characteristics may be adjusted by adjusting the length of the tuning post.

The band notch and operation frequency band characteristics may be adjusted by adjusting the width of the tuning post.

The band notch and operation frequency band characteristics may be adjusted by adjusting the thickness of the tuning post.

The band notch and operation frequency band characteristics may be adjusted by adjusting the position of the tuning post inside the resonator.

The all-metal vivaldi antenna may further include: a tuning cap that is formed in a structure extending from an end of the tuning post in a direction perpendicular to an extending direction of the tuning post or in an arbitrary angular direction.

The band notch and operation frequency band characteristics may be adjusted by adjusting a length of the tuning cap.

The band notch and operation frequency band characteristics may be adjusted by adjusting a width of the tuning cap.

The band notch and operation frequency band characteristics may be adjusted by adjusting a thickness of the tuning cap.

According to another embodiment, an array antenna includes: a ground plate; and a plurality of all-metal vivaldi antennas that are arranged in one direction or at a right angle direction on the ground plate, in which each of the plurality of all-metal vivaldi antennas includes: an antenna conductor that includes two radiators positioned on the ground plate and facing each other; a resonator that is formed by removing a portion of a connection part between the antenna conductor and the ground plate and shares one side with the ground plate, and at least one of the plurality of all-metal vivaldi antennas includes a tuning post that is formed in the column structure extending from the ground plate toward an inside of the resonator.

The band notch and operation frequency band characteristics may be adjusted by positioning the tuning post inside the resonator.

The band notch and operation frequency band characteristics may be adjusted by adjusting a length of the tuning post.

The band notch and operation frequency band characteristics may be adjusted by adjusting a width of the tuning post.

The band notch and operation frequency band characteristics may be adjusted by adjusting a thickness of the tuning post.

The band notch and operation frequency band characteristics may be adjusted by adjusting the position of the tuning post inside the resonator.

At least one of the plurality of all-metal vivaldi antennas may further include a tuning cap that is formed in a structure extending from an end of the tuning post in a direction perpendicular to an extending direction of the tuning post The band notch and operation frequency band characteristics may be adjusted by adjusting a length of the tuning cap.

The band notch and operation frequency band characteristics may be adjusted by adjusting a width of the tuning cap.

The band notch and operation frequency band characteristics may be adjusted by adjusting a thickness of the tuning cap.

The all-metal vivaldi antenna according to an exemplary embodiment of the present invention may change the band notch and the operation frequency band. Accordingly, there is no need to redesign and remanufacture the antenna when there is a change in the band notch or the operation frequency band.

The band notch characteristics may be adjusted by positioning the tuning post inside the resonator. The operation frequency band characteristics may be adjusted by positioning the tuning post inside the resonator. The band notch and operation frequency band characteristics may be adjusted by adjusting the length of the tuning post. The band notch and operation frequency band characteristics may be adjusted by adjusting the width of the tuning post. The band notch and operation frequency band characteristics may be adjusted by adjusting the thickness of the tuning post. The band notch and operation frequency band characteristics may be adjusted by adjusting the position of the tuning post inside the resonator.

The band notch characteristics may be adjusted by positioning the tuning post and the tuning cap inside the resonator. The operation frequency band characteristics may be adjusted by positioning the tuning post and the tuning cap inside the resonator. The band notch and operation frequency band characteristics may be adjusted by adjusting the length of the tuning cap. The band notch and operation frequency band characteristics may be adjusted by adjusting the width of the tuning cap. The band notch and operation frequency band characteristics may be adjusted by adjusting the thickness of the tuning cap.

DETAILED DESCRIPTION

Figure 1:
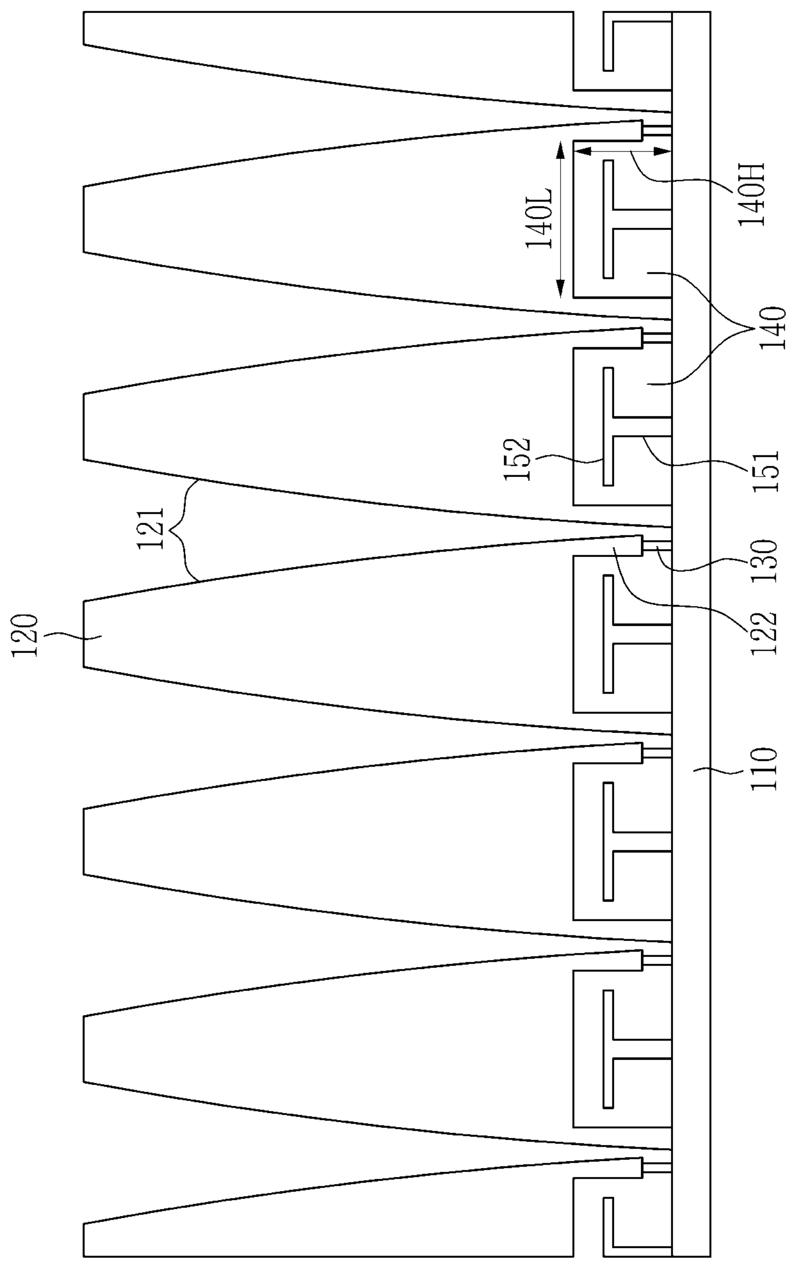
FIG. 1 is a diagram illustrating a one-dimensional array structure of an all-metal vivaldi antenna according to an exemplary embodiment of the present invention.

Hereinafter, exemplary embodiments of the present invention will be described in detail with reference to the accompanying drawings so that those skilled in the art to which the present invention pertains may easily practice the present invention. However, the present invention may be implemented in various different forms and is not limited to exemplary embodiments provided herein.

Portions unrelated to the description will be omitted in order to obviously describe the present invention, and similar components will be denoted by the same or similar reference numerals throughout the present specification.

In addition, unless explicitly described to the contrary, the word "comprise", and variations such as "comprising", will be understood to imply the inclusion of stated elements but not the exclusion of any other elements.

Figure 2:
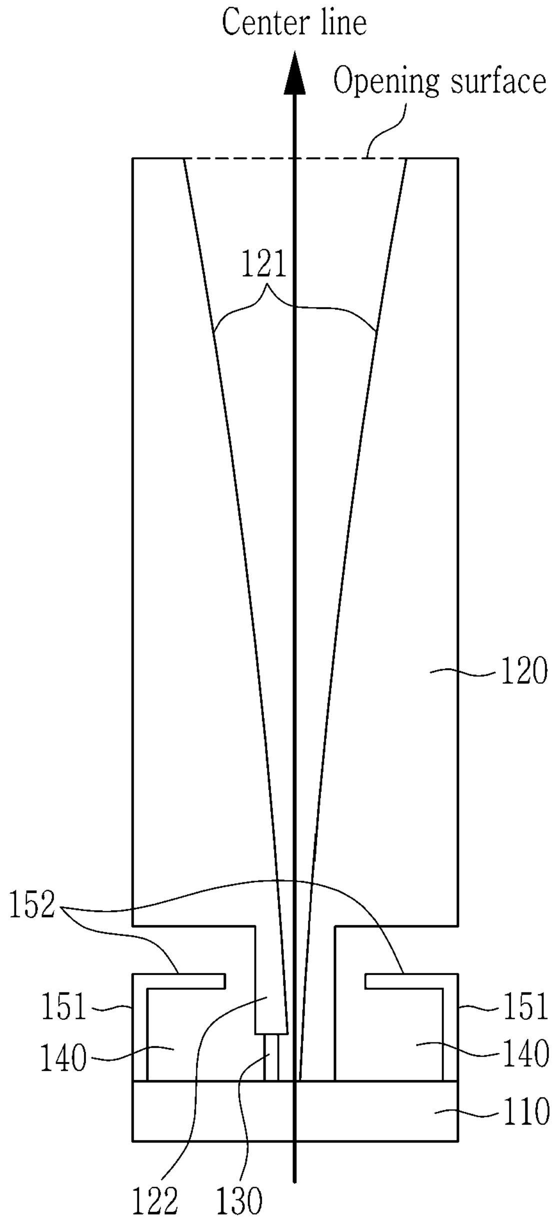
FIG. 2 is a diagram illustrating the all-metal vivaldi antenna according to the exemplary embodiment of the present invention.
Figure 3:
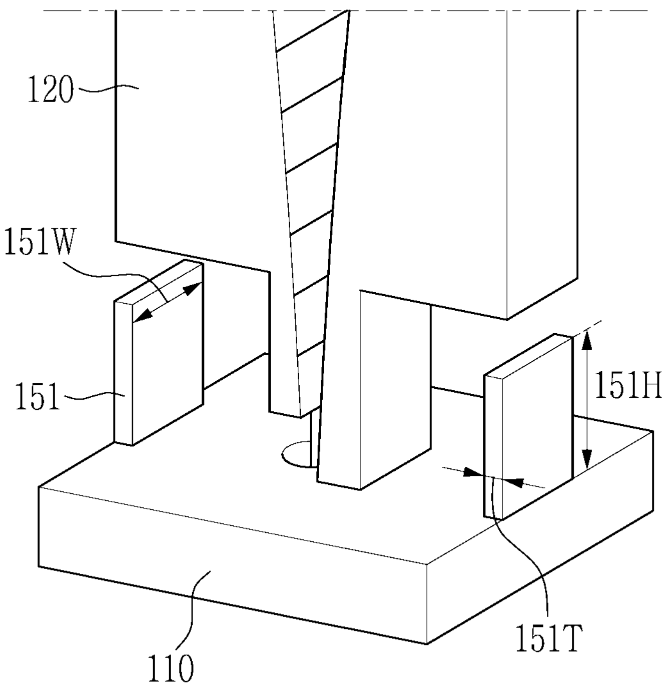
FIG. 3 is an enlarged view of a resonator and a tuning post in FIG. 2.
Figure 4:
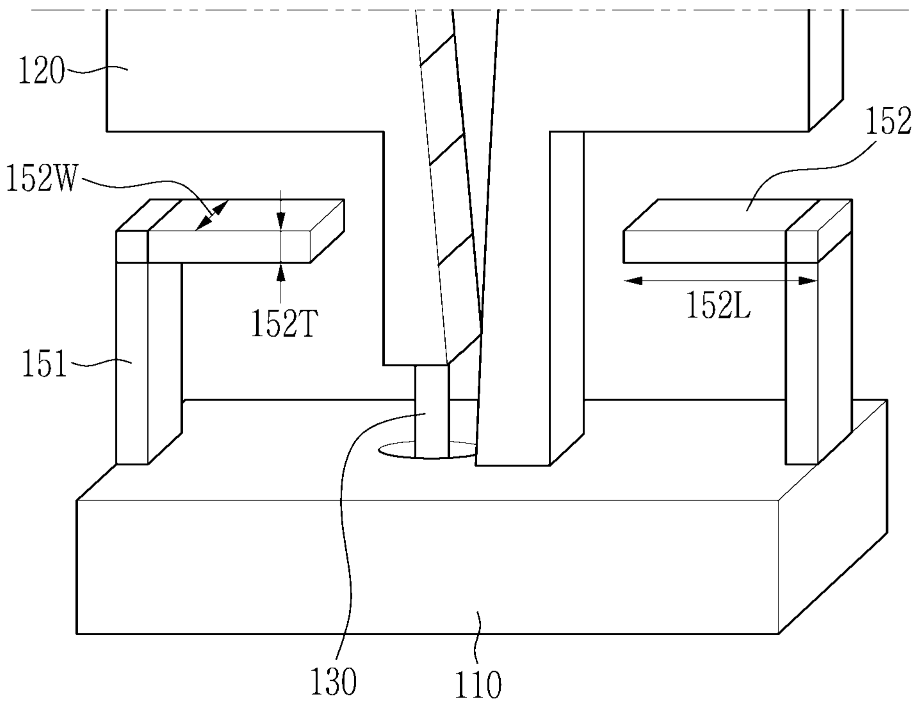
FIG. 4 is an enlarged view of a resonator, a tuning post, and a tuning cap in FIG. 2.

FIG. 1 is a diagram illustrating a one-dimensional array structure of an all-metal vivaldi antenna according to an exemplary embodiment of the present invention. FIG. 2 is a diagram illustrating the all-metal vivaldi antenna according to the exemplary embodiment of the present invention. FIG. 3 is an enlarged view of a resonator and a tuning post in FIG. 2. FIG. 4 is an enlarged view of a resonator, a tuning post, and a tuning cap in FIG. 2.

Referring to FIGS. 1 to 4, an all-metal vivaldi antenna according to an exemplary embodiment of the present invention may include a ground plate 110, an antenna conductor 120, a feeding line 130, a resonator 140, and a tuning post 151, and a tuning cap 152.

The antenna conductor 120 may be made of metal (all metal). The antenna conductor 120 may include two radiators 121 positioned on the ground plate 110. The two radiators 121 may face each other based on a center line. Each radiator 121 may form an inclined plane starting from the ground plate 110 and decreasing in width in an exponential form. A spacing between the two facing resonators 121 may gradually increase toward an opening surface. The radiator 121 may have a symmetrical structure with respect to the center line. The opening surface is a virtual surface connecting the two antenna conductors 120 constituting the radiator 121 and means a portion in contact with the free space.

One of the two radiators 121 has a feeder 122 formed thereon. The feeder 122 is a part where a signal fed from the feeding line 130 is excited. The feeder 122 has an inclined surface continuous with the inclined surface of the radiator 121 and may be spaced apart from the ground plate 110 by a gap.

The feeding line 130 may be connected to a coaxial line and may be connected to one antenna conductor 120 through the feeder 122. The feeding line 130 transmits the fed signal applied through the coaxial line to the radiator 121 through the feeder 122, and the radiator 121 induces the fed signal to the opening surface.

The resonator 140 has a form of a short-circuited stub electrically connected to the feeding line 130 in parallel, and serves to expand the operation frequency band. The resonator 140 shares one side with the ground plate 110. The resonator 140 has a form in which a portion of a connection part between the antenna conductor 120 and the ground plate 110 is removed. The resonator 140 may be formed by the arrayed antenna conductors 120. The resonator 140 may be formed in various structures such as a quadrangle, a semicircle, a circle, and a triangle. In an exemplary embodiment, the resonator 140 may be formed in a rectangular shape having a predetermined length 140L and a predetermined height 140H.

The tuning post 151 and the tuning cap 152 are positioned inside the resonator 140. The tuning post 151 and the tuning cap 152 may be made of a metallic material.

The tuning post 151 may be formed in a column structure such as a circle or a quadrangle that is erected (extended) from the ground plate 110 toward the inside of the resonator 140. For example, the tuning post 151 may be formed to extend in a direction perpendicular to the surface of the ground plate 110. The tuning post 151 may be positioned at an arbitrary position inside the resonator 140. Depending on a length 151H, a width 151W, a thickness 151T, and a position of the tuning post 151, a band notch frequency and an operation frequency band may vary.

In other words, the band notch characteristics may be adjusted by positioning the tuning post 151 inside the resonator 140. The operation frequency band characteristics may be adjusted by positioning the tuning post 151 inside the resonator 140. The band notch and operation frequency band characteristics may be adjusted by adjusting the length 151H of the tuning post 151. The band notch and operation frequency band characteristics may be adjusted by adjusting the width 151W of the tuning post 151. The band notch characteristics and the operation frequency band characteristics may be adjusted by adjusting the thickness 151T of the tuning post 151. The band notch and operation frequency band characteristics may be adjusted by adjusting the position of the tuning post 151 inside the resonator.

The tuning cap 152 may be formed to extend horizontally from an end of the tuning post 151 extending from the ground plate 110. That is, the tuning cap 152 may be formed to extend from the end of the tuning post 151 in a direction perpendicular to the extending direction of the tuning post 151 or in an arbitrary angular direction. The shape of the tuning cap 152 may be formed in a plate structure such as a circle or a quadrangle. The tuning cap 152 may be connected to an end of the tuning post 151 and positioned inside the resonator 140. Depending on a length 152L, a width 152W, and a thickness 151T of the tuning post 152, the band notch frequency and an operation frequency band may vary.

In other words, the band notch characteristics may be adjusted by positioning the tuning post 151 and the tuning cap 152 inside the resonator 140. The operation frequency band characteristics may be adjusted by positioning the tuning post 151 and the tuning cap 152 inside the resonator 140. The band notch and operation frequency band characteristics may be adjusted by adjusting the length 152L of the tuning cap 152. The band notch and operation frequency band characteristics may be adjusted by adjusting the width 152W of the tuning cap 152. The band notch characteristics and the operation frequency band characteristics may be adjusted by adjusting the thickness 152T of the tuning cap 152.

An array antenna may be implemented by arraying the above-described all-metal vivaldi antenna in one direction or in a right angle direction. In other words, the array antenna includes a plurality of all-metal vivaldi antennas arrayed in one direction or in a right angle direction. The plurality of antenna conductors 120 are arrayed in one direction or in the right angle direction on the ground plate 110. In this case, at least one of the plurality of all-metal vivaldi antennas may include the tuning post 151 and may additionally include the tuning cap 152.

Figure 5:
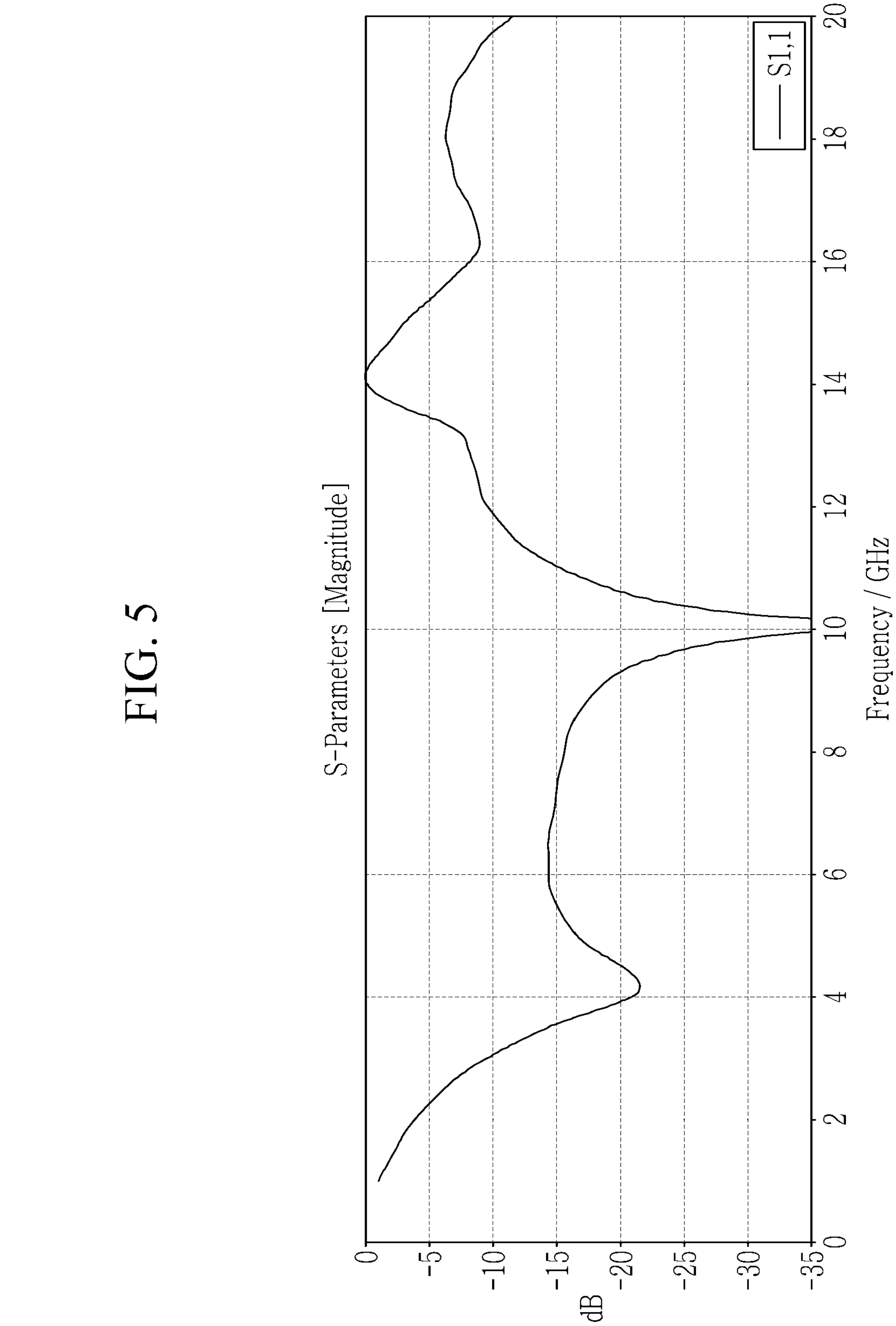
FIG. 5 is a diagram illustrating results of computational analysis of active reflection characteristics of an antenna positioned in a center when the all-metal vivaldi antenna without a tuning post and a tuning cap is configured as a two-dimensional infinite array.

FIG. 5 is a diagram illustrating results of computational analysis of active reflection characteristics of an antenna positioned in a center when the all-metal vivaldi antenna without a tuning post and a tuning cap is configured as a two-dimensional infinite array.

Referring to FIG. 5, it may be seen that the all-metal vivaldi antenna without the tuning post and the tuning cap has an active reflection characteristic of −12 dB or less in an operation frequency band of 3 GHz to 12 GHz.

Figure 6:
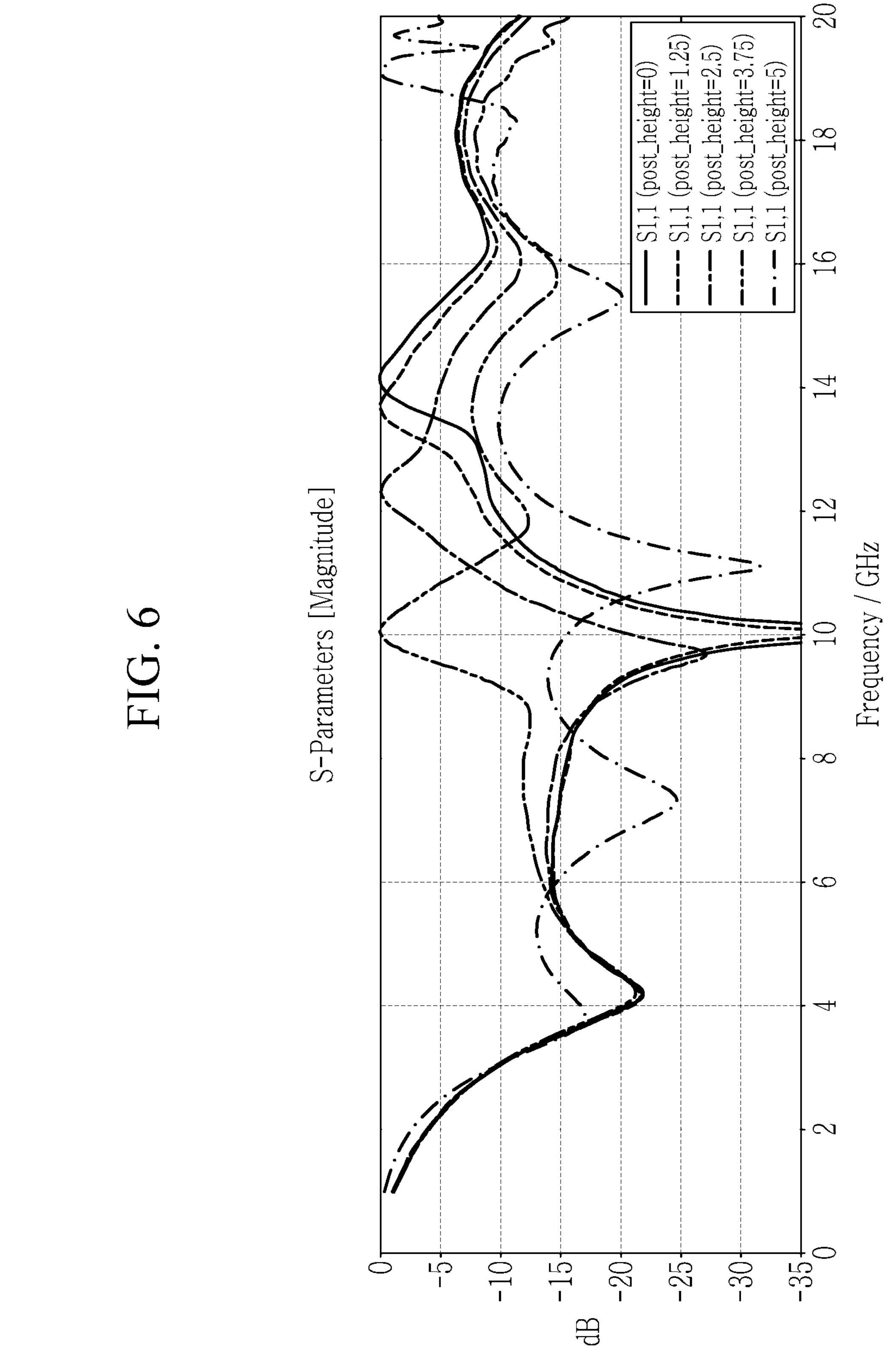
FIG. 6 is a diagram illustrating the results of the computational analysis of active reflection characteristics according to a length of the tuning post as return loss characteristics of the antenna positioned in the center when the all-metal vivaldi antenna according to the exemplary embodiment of the present invention is composed of the two-dimensional infinite array including the tuning post.

FIG. 6 is a diagram illustrating the results of the computational analysis of active reflection characteristics according to a length of the tuning post as return loss characteristics of the antenna positioned in the center when the all-metal vivaldi antenna according to the exemplary embodiment of the present invention is composed of the two-dimensional infinite array including the tuning post.

Referring to FIG. 6, it may be seen that the band notch frequency and the operation frequency band may vary by adjusting the length 151H of the tuning post 151.

Figure 7:
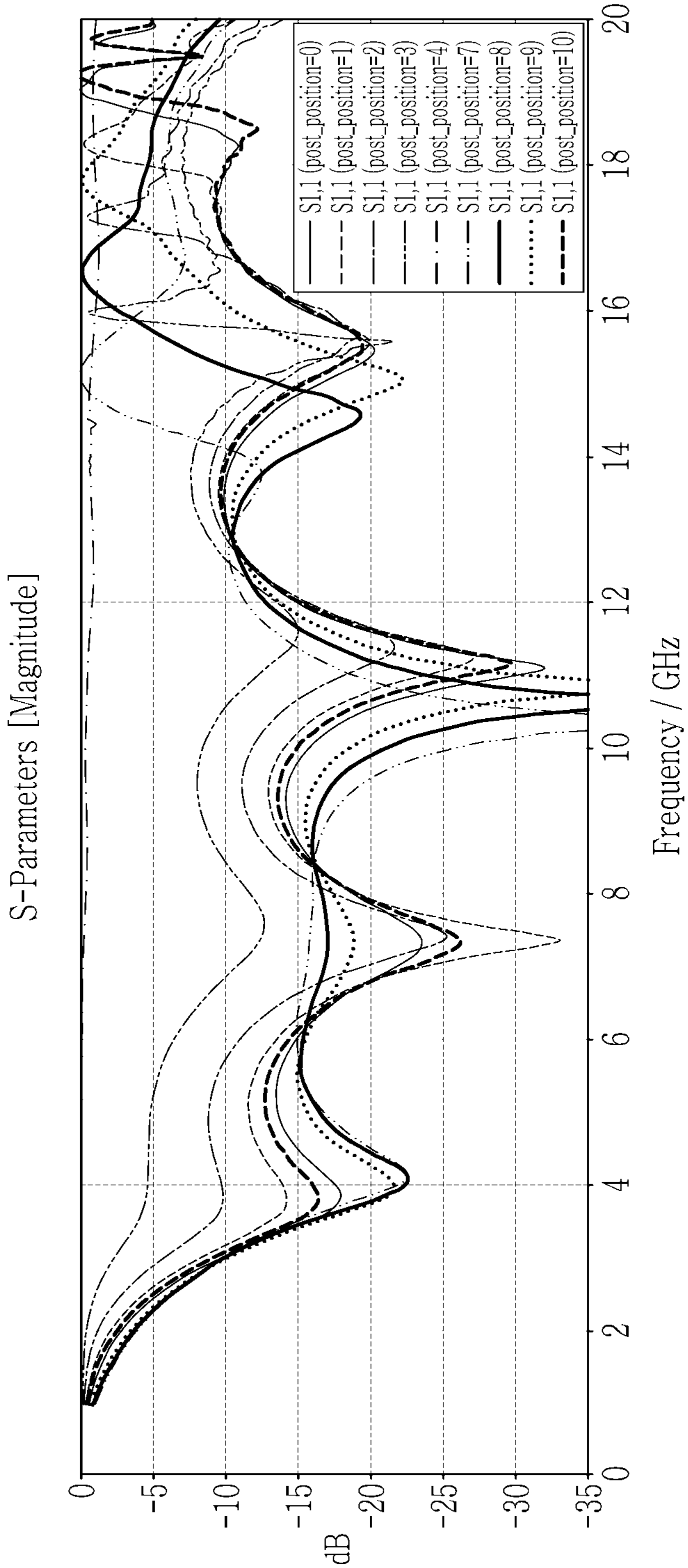
FIG. 7 is a diagram illustrating the results of the computational analysis of the active reflection characteristics by changing a position of the tuning post as return loss characteristics of the antenna positioned in the center when the all-metal vivaldi antenna according to the exemplary embodiment of the present invention is composed of the two-dimensional infinite array including the tuning post.

FIG. 7 is a diagram illustrating the results of the computational analysis of the active reflection characteristics by changing a position of the tuning post as return loss characteristics of the antenna positioned in the center when the all-metal vivaldi antenna according to the exemplary embodiment of the present invention is composed of the two-dimensional infinite array including the tuning post Referring to FIG. 7, it may be seen that the band notch frequency and the operation frequency band may vary by adjusting the position of the tuning post 151.

Figure 8:
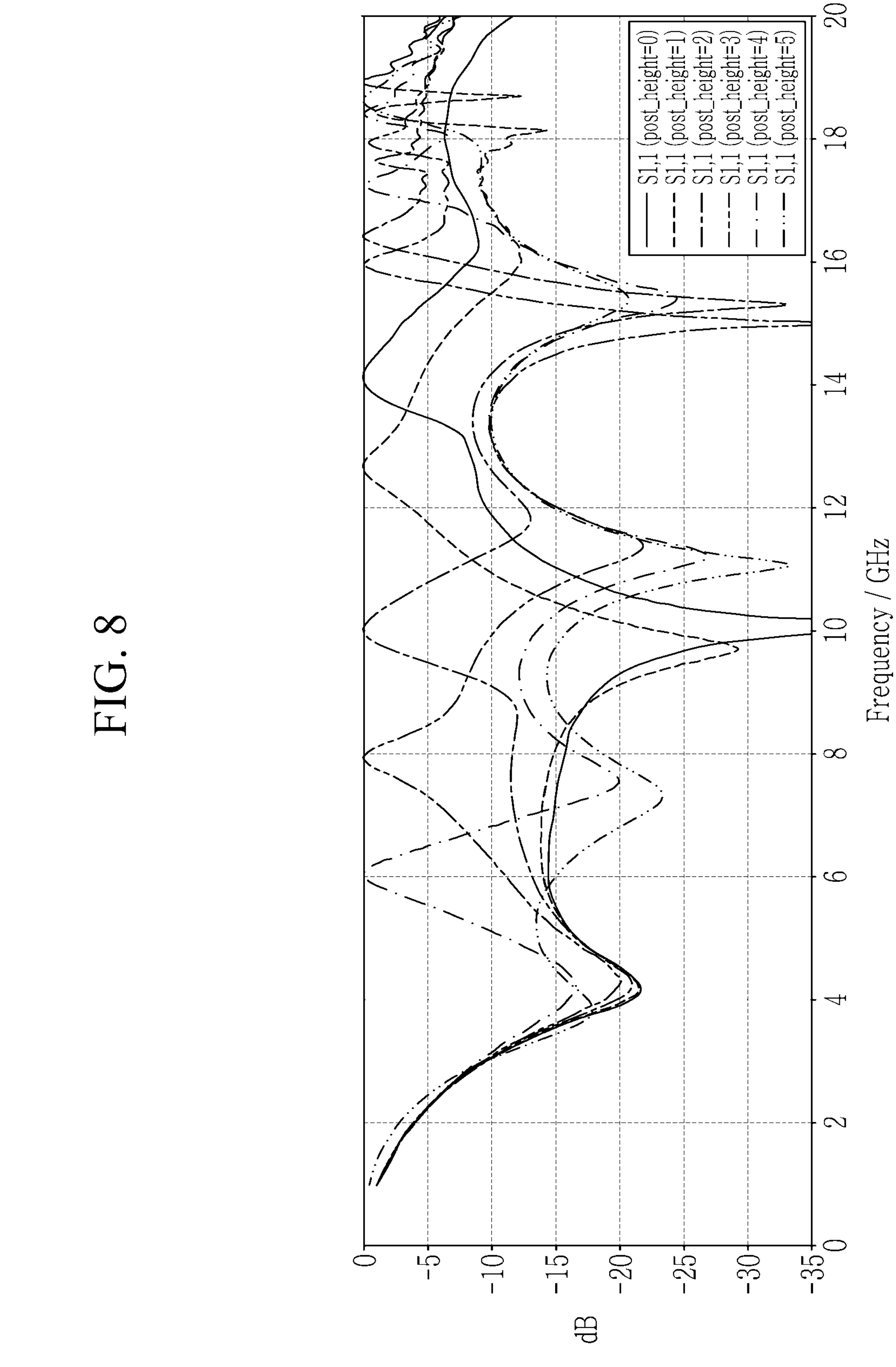
FIG. 8 is a diagram illustrating the results of the computational analysis of the active reflection characteristics according to the length of the tuning post as the return loss characteristics of the antenna positioned in the center when the all-metal vivaldi antenna according to the exemplary embodiment of the present invention is composed of the two-dimensional infinite array including the tuning post and the tuning cap.

FIG. 8 is a diagram illustrating the results of the computational analysis of the active reflection characteristics according to the length of the tuning post as the return loss characteristics of the antenna positioned in the center when the all-metal vivaldi antenna according to the exemplary embodiment of the present invention is composed of the two-dimensional infinite array including the tuning post and the tuning cap.

Referring to FIG. 8, it may be seen that the band notch frequency and the operation frequency band may vary by adjusting the length 151H of the tuning post 151. Compared to the exemplary embodiment of FIG. 6, it may be seen that a variable width of the band notch frequency is expanded by the tuning cap 152.

Figure 9:
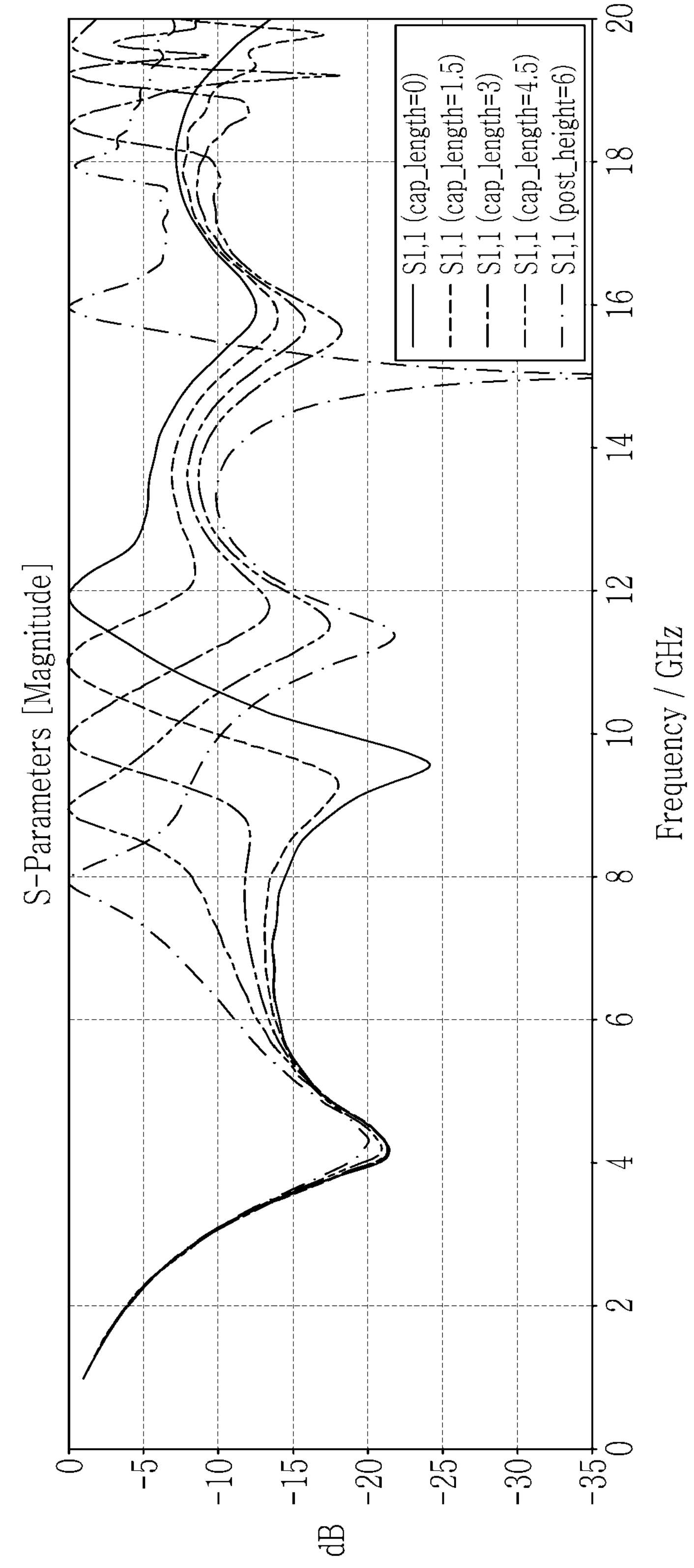
FIG. 9 is a diagram illustrating the results of the computational analysis of the active reflection characteristics according to the length of the tuning cap as the return loss characteristics of the antenna positioned in the center when the all-metal vivaldi antenna according to the exemplary embodiment of the present invention is composed of the two-dimensional infinite array including the tuning post and the tuning cap.

FIG. 9 is a diagram illustrating the results of the computational analysis of the active reflection characteristics according to the length of the tuning cap as the return loss characteristics of the antenna positioned in the center when the all-metal vivaldi antenna according to the exemplary embodiment of the present invention is composed of the two-dimensional infinite array including the tuning post and the tuning cap.

Referring to FIG. 9, it may be seen that the variable width of the band notch frequency may be expanded and the operation frequency band may vary by adjusting the length 152L of the tuning cap 152.

A case in which the all-metal vivaldi antenna according to the exemplary embodiment of the present invention constitutes a two-dimensional array antenna will be described with reference to FIGS. 10 to 16.

Figure 10:
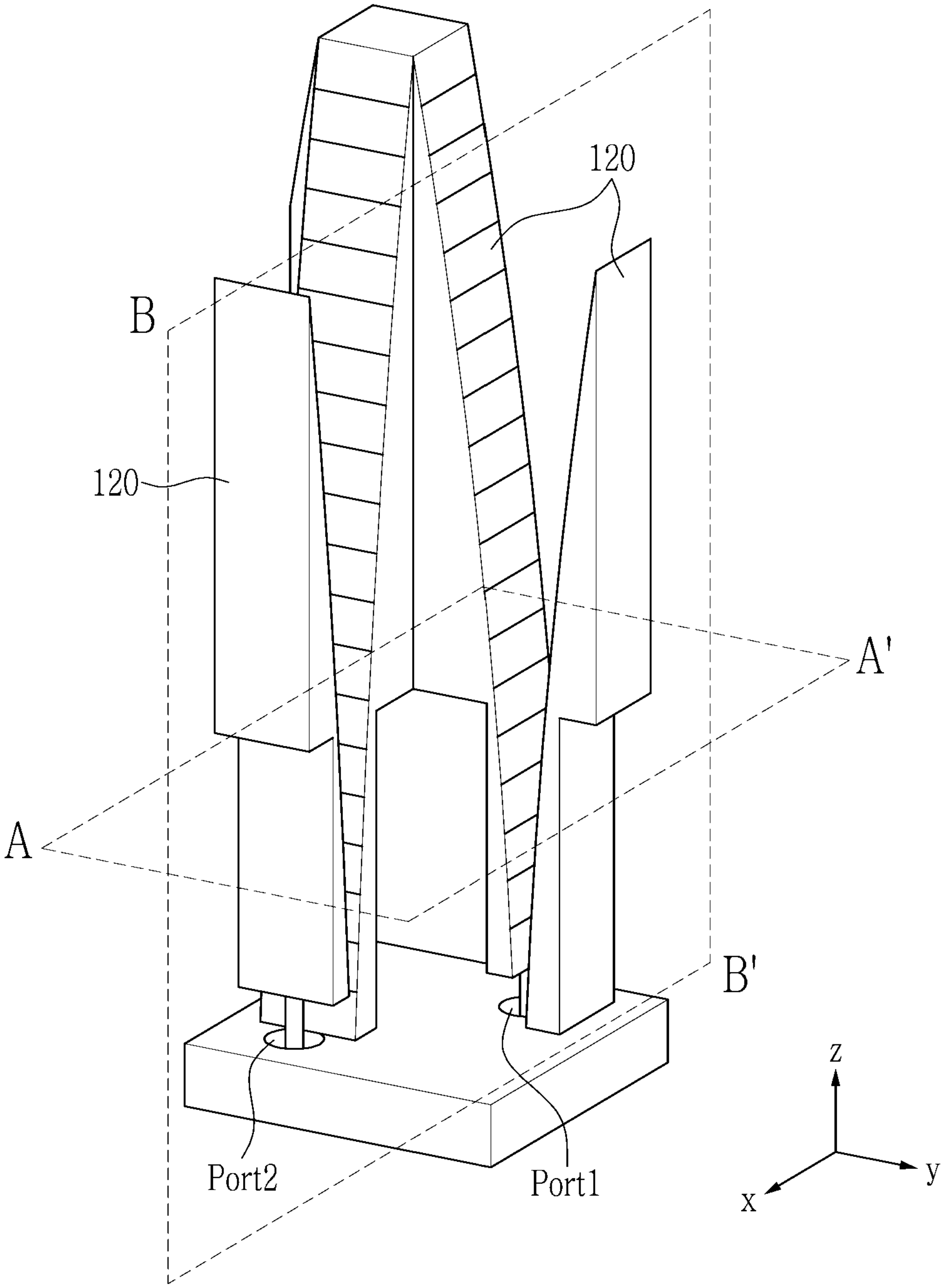
FIG. 10 is a diagram illustrating a unit array antenna in a two-dimensional array antenna constituted by the all-metal vivaldi antenna according to the exemplary embodiment of the present invention.

FIG. 10 is a diagram illustrating a unit array antenna in a two-dimensional array antenna constituted by the all-metal vivaldi antenna according to the exemplary embodiment of the present invention.

Referring to FIG. 10, the plurality of antenna conductors 120 may be two-dimensionally arrayed in intersecting directions (orthogonal direction, x-axis direction, and y-axis direction) to constitute an array antenna having a two-dimensional structure. The array antenna with the two-dimensional structure may implement dual polarization characteristics. The antenna conductor 120 may be integrally formed in a plus (+) shape or an X shape in a top view. The antenna arrayed in the y-axis direction is connected to a first port Port1, and the antenna arrayed in the x-axis direction is connected to a second port Port2. The first port Port1 means a feeding port of the antenna arrayed in the y-axis direction, and the second port Port2 means a feeding port of the antenna arrayed in the x-axis direction.

Figure 11:
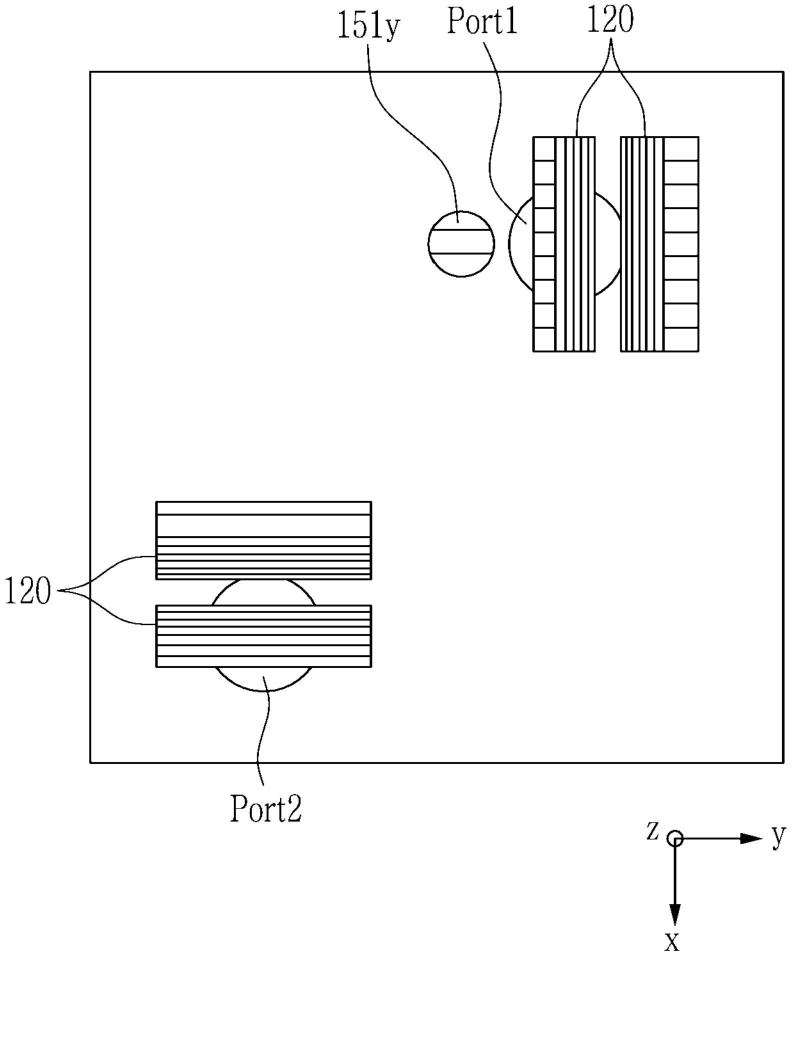
FIG. 11 is a cross-section view taken along line A-A' of FIG. 10 and illustrates a case in which the tuning post is positioned only in a y-axis direction.
Figure 12:
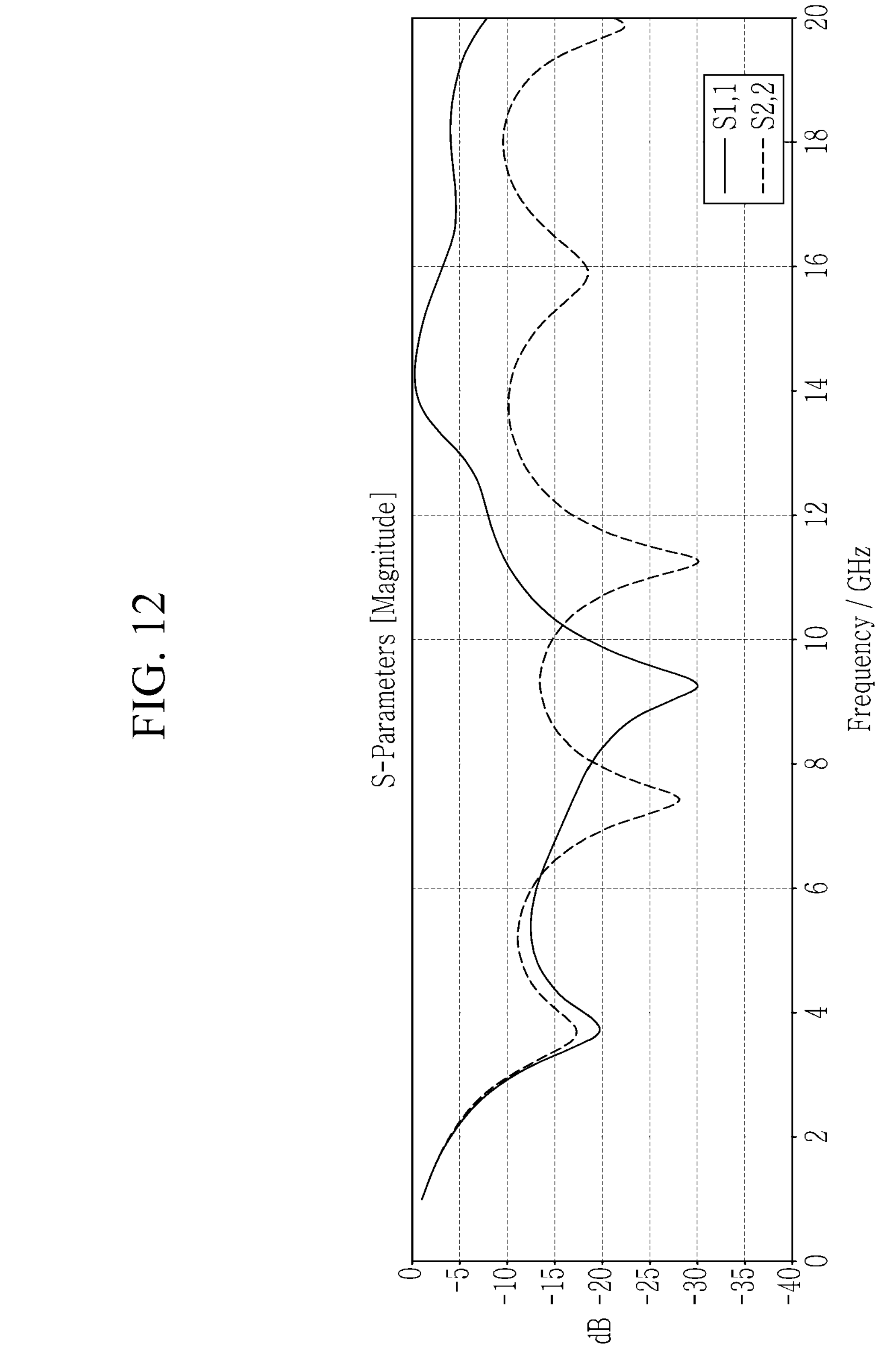
FIG. 12 is a diagram illustrating results of computational analysis of active reflection characteristics of antennas for a first port and a second port when the tuning post is positioned only in the y-axis direction as in the exemplary embodiment of FIG. 11.

FIG. 11 is a cross-section view taken along line A-A' of FIG. 10 and illustrates a case in which the tuning post is positioned only in a y-axis direction. FIG. 12 is a diagram illustrating results of computational analysis of active reflection characteristics of antennas for the first port and the second port when the tuning post is positioned only in the y-axis direction as in the exemplary embodiment of FIG. 11.

Referring to FIGS. 11 and 12, when a first tuning post 151*y* is positioned only in the y-axis direction, the band notch characteristic is shown at 14 GHz in the first port Port1 by the first tuning post 151*y* (S1, 1). However, since there is no tuning post in the x-axis direction, the band notch characteristic is not shown in the second port Port2 (S2, 2).

Figure 13:
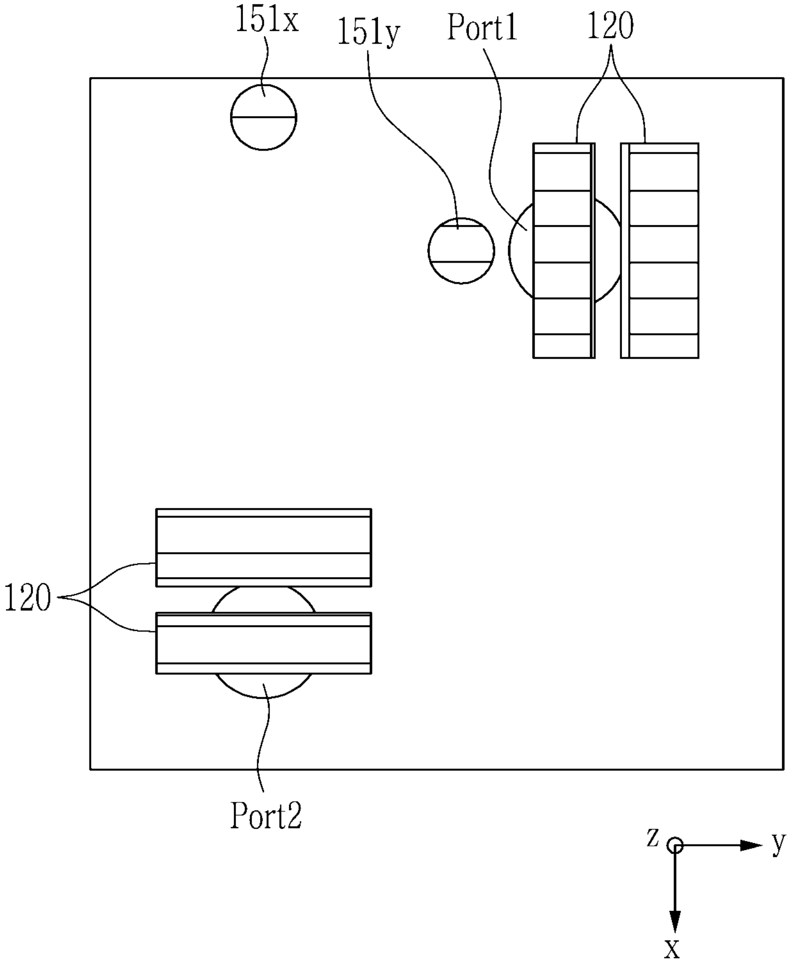
FIG. 13 is a cross-section view taken along line A-A' of FIG. 10 and illustrates a case in which the tuning post is positioned in an x-axis direction and the y-axis direction.
Figure 14:
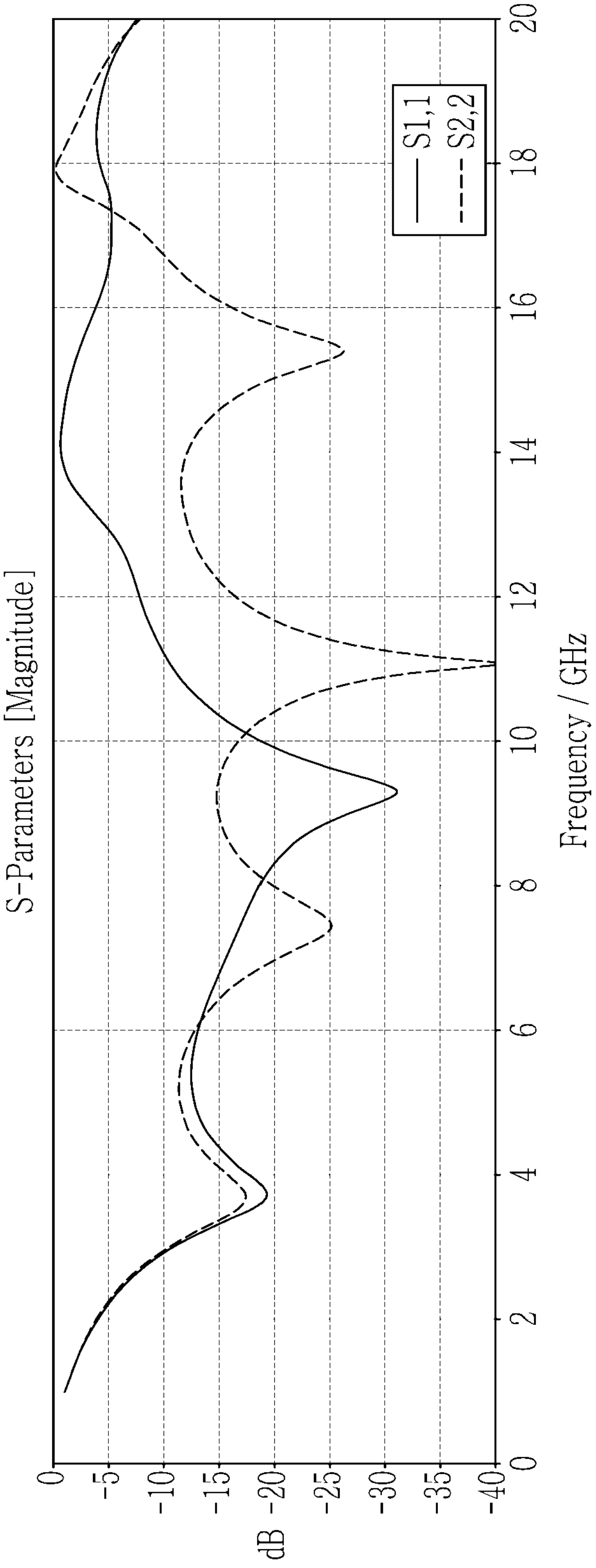
FIG. 14 is a diagram illustrating the results of the computational analysis of the active reflection characteristics of the antennas for the first port and the second port when the tuning post is positioned only in the x-axis direction and the y-axis direction as in the exemplary embodiment of FIG. 13.

FIG. 13 is a cross-section view taken along line A-A' of FIG. 10 and illustrates a case in which the tuning post is positioned in the x-axis direction and the y-axis direction. FIG. 14 is a diagram illustrating the results of the computational analysis of the active reflection characteristics of the antennas for the first port and the second port when the tuning post is positioned only in the x-axis direction and the y-axis direction as in the exemplary embodiment of FIG. 13.

Referring to FIGS. 13 and 14, the band notch characteristic is maintained at 14 GHz as in the case of FIG. 12 in the first port Port1 (S1, 1). As a second tuning post 151*x* is additionally positioned in the x-axis direction, the second port Port2 shows the band notch characteristics at 18 GHZ (S2, 2). It may be seen that the tuning posts 151*x* and 151*y* are positioned at different positions in the x-axis direction and the y-axis direction, respectively, so that different band notch frequency characteristics for each port may be implemented.

Figure 15:
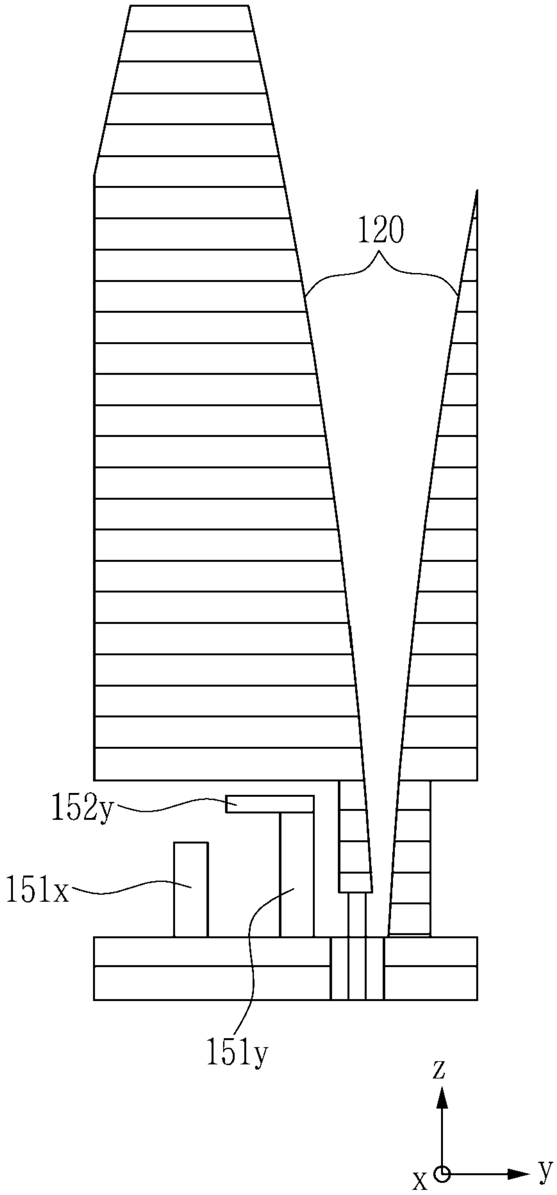
FIG. 15 is a cross section taken along line B-B' of FIG. 10 and is a diagram illustrating a case in which a first tuning post and a second tuning post are positioned and the tuning cap is added to the first tuning post.
Figure 16:
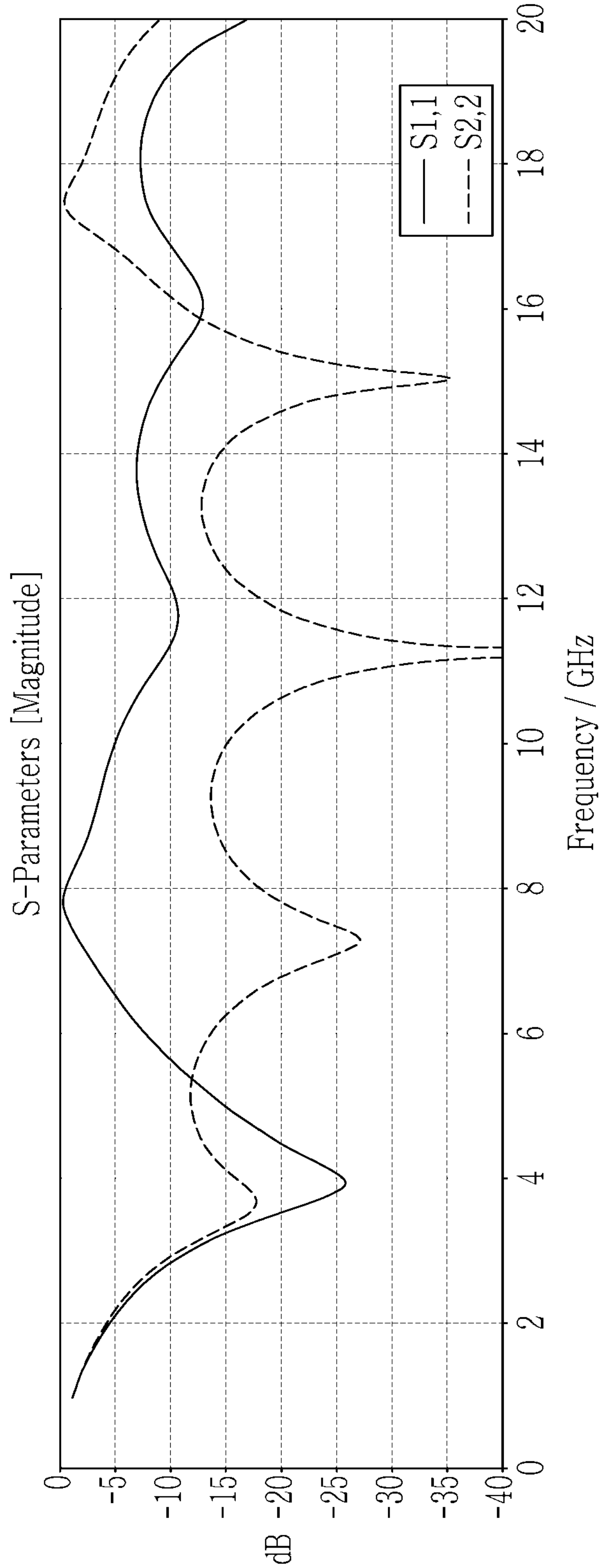
FIG. 16 is a diagram illustrating the results of the computational analysis of the active reflection characteristics of the antenna for the first port and the second port when the first tuning post and the second tuning post are positioned and the tuning cap is added to the first tuning post, as in the exemplary embodiment of FIG. 15.

FIG. 15 is a cross section taken along line B-B' of FIG. 10 and is a diagram illustrating a case in which a first tuning post and a second tuning post are positioned and the tuning cap is added to the first tuning post. FIG. 16 is a diagram illustrating the results of the computational analysis of the active reflection characteristics of the antenna for the first port and the second port when the first tuning post and the second tuning post are positioned and the tuning cap is added to the first tuning post, as in the exemplary embodiment of FIG. 15.

Referring to FIGS. 15 and 16, when the first tuning post 151*y* and the second tuning post 151*x* are positioned and the tuning cap 152*y* is added to the first tuning post 151*y*, the second port Port2 shows the band notch characteristics at 18 GHz as in the case of FIG. 14 (S2, 2). Meanwhile, it is shown that the band notch characteristics of the first port Port1 are different from the case of FIG. 14 (S1, 1). That is, it may be seen that the band notch frequency is controlled by the tuning cap 152*y*.

Figure 17:
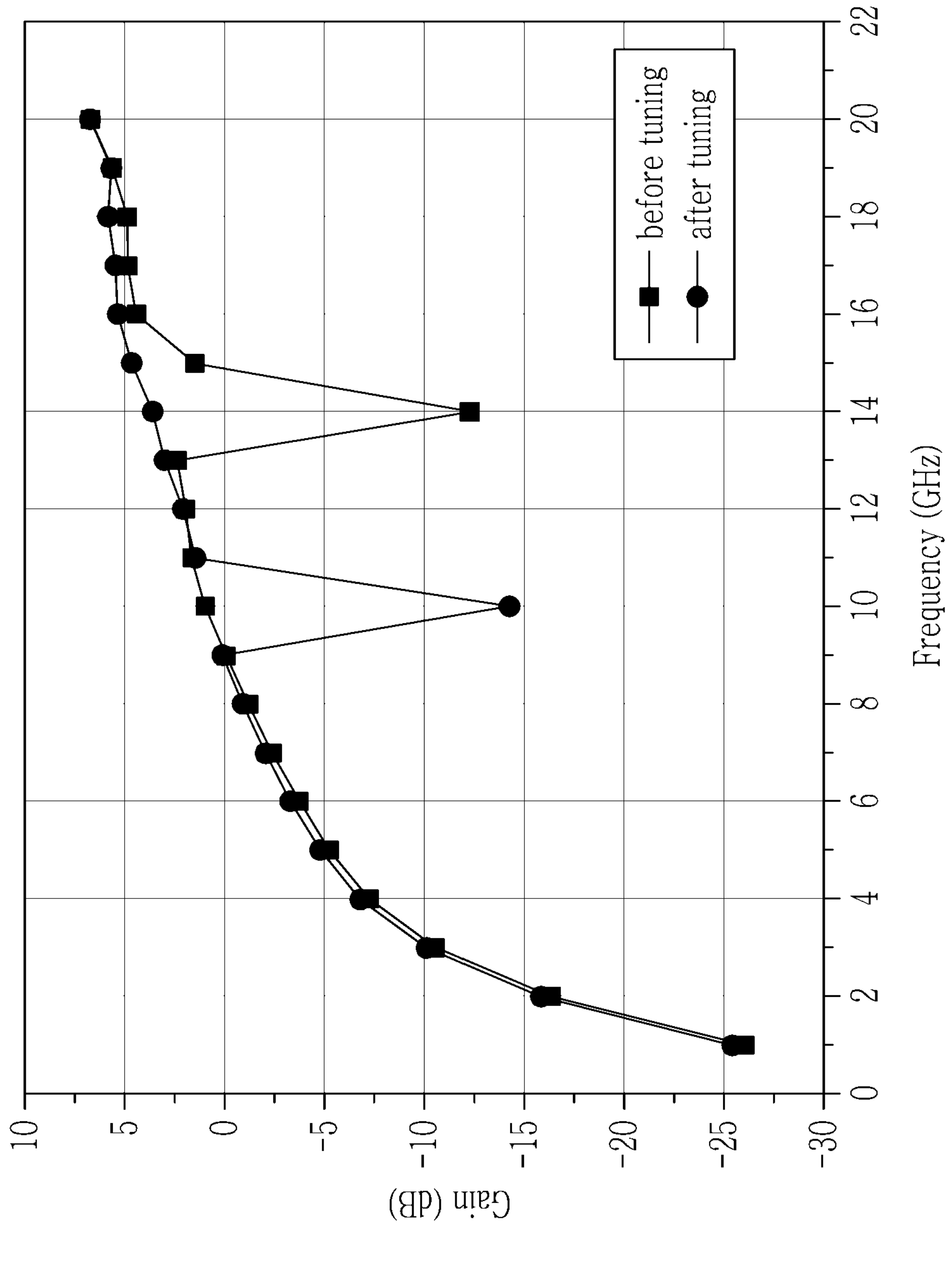
FIG. 17 is a diagram illustrating antenna gain characteristics for each frequency of the all-metal vivaldi antenna according to the exemplary embodiment of the present invention.

FIG. 17 is a diagram illustrating antenna gain characteristics for each frequency of the all-metal vivaldi antenna according to the exemplary embodiment of the present invention.

Referring to FIG. 17, compared to the case where the tuning post 151 and the tuning cap 152 do not exist (before tuning), in the case of the all-metal vivaldi antenna including the tuning post 151 and the tuning cap 152 according to the exemplary embodiment of the present invention (after turning), it may be seen that the gain decreases and the operation frequency band changes at the band notch frequency.

Figure 18:
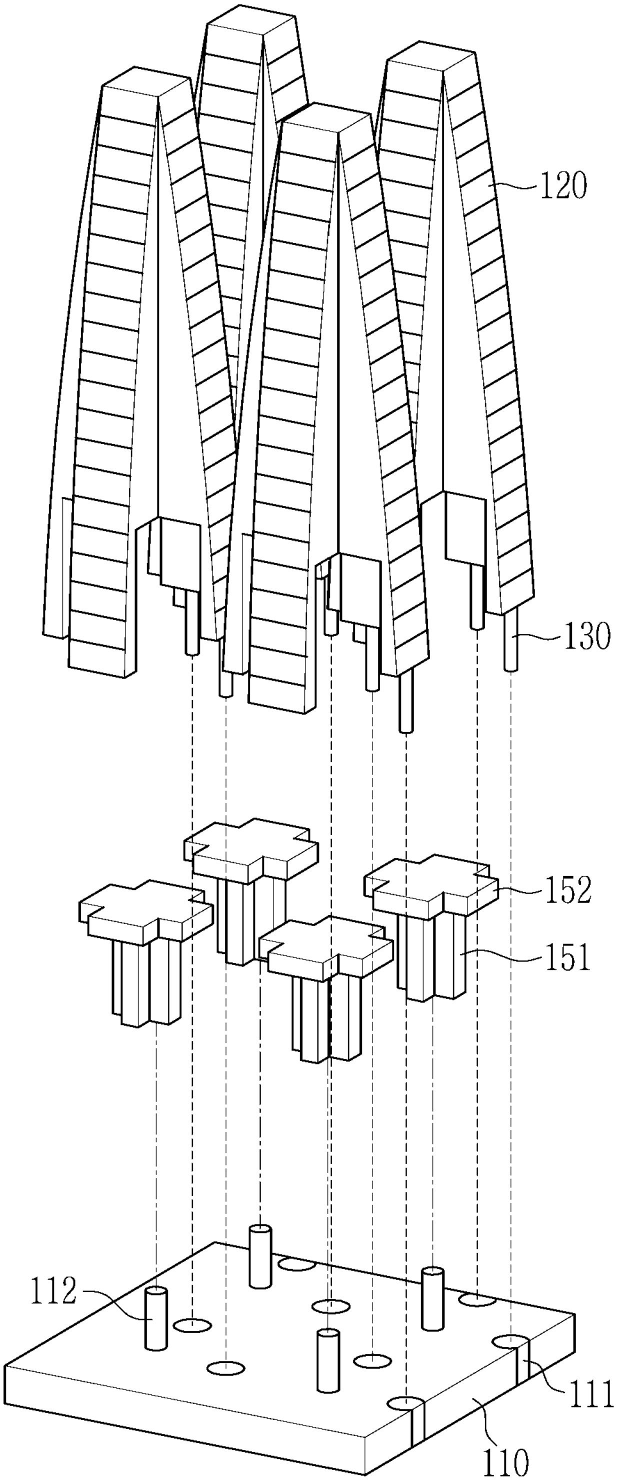
FIG. 18 is a diagram illustrating a method of manufacturing an all-metal vivaldi antenna according to the exemplary embodiment of the present invention.

FIG. 18 is a diagram illustrating a method of manufacturing an all-metal vivaldi antenna according to the exemplary embodiment of the present invention.

Referring to FIG. 18, the antenna conductor 120 may be fixed to the ground plate 110 using a screw.

The dielectric 111 is positioned on the ground plate 110 and has a function of separating the conductor of the feeding line 130 from the ground plate 110 while maintaining the characteristic impedance of the coaxial line. When the feeding line 130 passes through the ground plate 110, the dielectric 111 may insulate between the ground plate 110 and the feeding line 130.

The tuning post 151 may be fixed to the ground plate 110 using the screw 112. A tap may be formed inside the tuning post 151 so that the tuning post 151 may be coupled with the screw 112. The tuning post 151 may have various shapes such as a cylinder or a quadrangle.

The tuning cap 152 may be fixed to the tuning post 151 using the screw or may be fixed to the tuning post 151 in an assembled form.

The shape of the tuning cap 152 may have a shape such as a circle, an oval, a quadrangle, a polygon, a plus (+) shape, or an x (x) shape. The tuning cap 152 may be electrically connected to the ground plate 110 through the tuning post 151.

The drawings and detailed description of the present invention referred to so far are only examples of the present invention, which are only used for the purpose of explaining the present invention, but are used to limit the scope of the present invention described in the meaning or claims. Therefore, it will be understood by those skilled in the art that various modifications and equivalent other embodiments are possible therefrom. Accordingly, an actual technical scope of the present invention is to be defined by a technical spirit of the following claims.

What is claimed is:

1. An all-metal vivaldi antenna, comprising:
a ground plate;
an antenna conductor that includes two radiators positioned on the ground plate and facing each other;
a resonator that is formed in each of the two radiators by removing a portion of a connection part between the antenna conductor and the ground plate and shares one side with the ground plate; and
a tuning post that is formed in each of the two resonators in a column structure extending from the ground plate with a free end toward an inside of the resonator.

2. The all-metal vivaldi antenna of claim 1, wherein:
band notch and operation frequency band characteristics are adjusted by positioning the tuning post inside the resonator.

3. The all-metal vivaldi antenna of claim 1, wherein:
a band notch and operation frequency band characteristics are adjusted by adjusting a length of the tuning post.

4. The all-metal vivaldi antenna of claim 1, wherein:
a band notch and operation frequency band characteristics are adjusted by adjusting a width of the tuning post.

5. The all-metal vivaldi antenna of claim 1, wherein:
a band notch and operation frequency band characteristics are adjusted by adjusting a thickness of the tuning post.

6. The all-metal vivaldi antenna of claim 1, wherein:
a band notch and operation frequency band characteristics are adjusted by adjusting a position of the tuning post inside the resonator.

7. The all-metal vivaldi antenna of claim 1, further comprising:
a tuning cap that is formed in a structure extending from an end of the tuning post in a direction perpendicular to an extending direction of the tuning post or in an arbitrary angular direction.

8. The all-metal vivaldi antenna of claim 7, wherein:
a band notch and operation frequency band characteristics are adjusted by adjusting a length of the tuning cap.

9. The all-metal vivaldi antenna of claim 7, wherein:
a band notch and operation frequency band characteristics are adjusted by adjusting a width of the tuning cap.

10. The all-metal vivaldi antenna of claim 7, wherein:
a band notch and operation frequency band characteristics are adjusted by adjusting a thickness of the tuning cap.

11. An array antenna, comprising:
a ground plate; and
a plurality of all-metal vivaldi antennas that are arranged in one direction or at a right angle direction on the ground plate,
wherein each of the plurality of all-metal vivaldi antennas includes:
an antenna conductor that includes two radiators positioned on the ground plate and facing each other;
a resonator that is formed in each of the two radiators by removing a portion of a connection part between the antenna conductor and the ground plate and shares one side with the ground plate, and at least one of the plurality of all-metal vivaldi antennas includes a tuning post that is formed in each of the two resonators in a column structure extending from the ground plate with a free end toward an inside of the resonator.

12. The array antenna of claim 11, wherein:

band notch and operation frequency band characteristics are adjusted by positioning the tuning post inside the resonator.

13. The array antenna of claim 11, wherein:

a band notch and operation frequency band characteristics are adjusted by adjusting a length of the tuning post.

14. The array antenna of claim 11, wherein:

the a band notch and operation frequency band characteristics are adjusted by adjusting a width of the tuning post.

15. The array antenna of claim 11, wherein:

band notch and operation frequency band characteristics are adjusted by adjusting a thickness of the tuning post.

16. The array antenna of claim 11, wherein:

a band notch and operation frequency band characteristics are adjusted by adjusting a position of the tuning post inside the resonator.

17. The array antenna of claim 11, wherein:

at least one of the plurality of all-metal vivaldi antennas further includes a tuning cap that is formed in a structure extending from an end of the tuning post in a direction perpendicular to an extending direction of the tuning post or in an arbitrary angular direction.

18. The array antenna of claim 17, wherein:

a band notch and operation frequency band characteristics are adjusted by adjusting a length of the tuning cap.

19. The array antenna of claim 17, wherein:

a band notch and operation frequency band characteristics are adjusted by adjusting a width of the tuning cap.

20. The array antenna of claim 17, wherein:

a band notch and operation frequency band characteristics are adjusted by adjusting a thickness of the tuning cap.

* * * * *